(12) United States Patent
Zhang et al.

(10) Patent No.: US 12,306,831 B2
(45) Date of Patent: May 20, 2025

(54) QUERY RESOURCE OPTIMIZER

(71) Applicant: INTERNATIONAL BUSINESS MACHINES CORPORATION, Armonk, NY (US)

(72) Inventors: Hong Mei Zhang, Beijing (CN); Shuo Li, Beijing (CN); Xiaobo Wang, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/539,612

(22) Filed: Dec. 1, 2021

(65) Prior Publication Data

US 2023/0169077 A1 Jun. 1, 2023

(51) Int. Cl.
*G06F 16/2453* (2019.01)
*G06F 11/34* (2006.01)
*G06N 5/022* (2023.01)

(52) U.S. Cl.
CPC .... *G06F 16/24532* (2019.01); *G06F 11/3419* (2013.01); *G06F 16/24542* (2019.01); *G06N 5/022* (2013.01)

(58) Field of Classification Search
CPC ........... G06F 16/24532; G06F 11/3419; G06F 16/24542; G06N 5/022
See application file for complete search history.

(56) References Cited

U.S. PATENT DOCUMENTS

| | | | | |
|---|---|---|---|---|
| 10,509,683 | B2* | 12/2019 | Furman | G06F 9/5061 |
| 10,936,589 | B1* | 3/2021 | Beitchman | G06F 16/24542 |
| 10,943,072 | B1* | 3/2021 | Jaganmohan | G06N 5/041 |
| 2002/0198984 | A1* | 12/2002 | Goldstein | G06F 11/3419 |
| | | | | 714/E11.181 |
| 2016/0132600 | A1 | 5/2016 | Woodhead et al. | |
| 2017/0039483 | A1 | 2/2017 | Cheng et al. | |
| 2017/0068708 | A1* | 3/2017 | Bottomley | G06F 16/24552 |
| 2017/0116043 | A1 | 4/2017 | Muthulingam et al. | |
| 2018/0218051 | A1* | 8/2018 | Berger | G06F 16/951 |
| 2018/0357291 | A1* | 12/2018 | Choi | G06F 16/25 |

(Continued)

FOREIGN PATENT DOCUMENTS

| | | |
|---|---|---|
| CA | 2965360 | 5/2016 |
| CN | 106446005 | 8/2020 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Ann J Lo
*Assistant Examiner* — Fernando M Mari Valcarcel
(74) *Attorney, Agent, or Firm* — Eric Chesley; Andrew D. Wright; Calderon Safran & Wright P.C.

(57) ABSTRACT

A method includes training, by a computing device, a model to identify SQL queries; identifying, by the computing device, incoming SQL queries; grouping, by the computing device, the incoming SQL queries into groups; monitoring, by the computing device, resource usage of the incoming SQL queries in the groups; and allocating, by the computing device, resources to an SQL query of the incoming SQL queries based on the monitoring.

17 Claims, 9 Drawing Sheets

(56) References Cited

U.S. PATENT DOCUMENTS

| | | | |
|---|---|---|---|
| 2019/0182167 A1* | 6/2019 | Wasay | H04L 47/25 |
| 2019/0258632 A1* | 8/2019 | Pal | G06F 16/2455 |
| 2019/0362005 A1 | 11/2019 | Sen et al. | |
| 2020/0104397 A1* | 4/2020 | Fan | G06F 9/52 |
| 2020/0167197 A1 | 5/2020 | Bahramshahry et al. | |
| 2020/0285642 A1 | 9/2020 | Bei et al. | |
| 2021/0034624 A1* | 2/2021 | Eltabakh | G06F 16/24542 |
| 2021/0096920 A1* | 4/2021 | Troester | G06F 9/505 |

FOREIGN PATENT DOCUMENTS

| | | |
|---|---|---|
| CN | 111723106 | 9/2020 |
| CN | 113157814 | 7/2021 |
| EP | 3128448 | 2/2017 |
| EP | 3215959 | 3/2018 |
| WO | 2016073730 | 5/2016 |

OTHER PUBLICATIONS

International Search Report and Written Opinion for PCT/CN2022/115766 dated Nov. 25, 2022; 9 Pages.

* cited by examiner

QUERY RESOURCE OPTIMIZER

BACKGROUND

Aspects of the disclosure relate generally to databases and, more particularly, to a query resource optimizer.

Databases include relatively large amounts of data. Accessing the data includes executing a search query, amongst other actions. However, problems arise from running search queries in parallel within the database. These problems include an exhaustion of computing resources and delays in executing the search queries, amongst other problems.

There are different approaches to running SQL (Structured Query Language) queries in parallel within a database. As an example, in a "first come, first get" approach, SQL queries are run as the database receives them. However, this approach has the disadvantage that a relatively lower priority SQL query may occupy resources over a relatively higher SQL query. As another example, in a "low priority, low resource" approach, an SQL query having a relatively lower priority is on hold until a relatively higher SQL query finishes. This approach has a disadvantage that performance of an SQL query may be relatively poor due to a previous SQL query already running in the relational database server(s). Accordingly, these approaches have the drawback of being unable to take advantage of computing resources dynamically.

SUMMARY

In a first aspect of the disclosure, there is a computer-implemented method including: training, by a computing device, a model to identify SQL queries; identifying, by the computing device, incoming SQL queries; grouping, by the computing device, the incoming SQL queries into groups; monitoring, by the computing device, resource usage of the incoming SQL queries in the groups; and allocating, by the computing device, resources to an SQL query of the incoming SQL queries based on the monitoring. In this manner, embodiments of the present disclosure allow for resource allocation, thereby preventing the overloading of resources and also preventing delays in executing search queries.

In embodiments, the method includes building a knowledge center of syntax. Further, the method may include identifying the incoming SQL queries by finding a match between syntax of the incoming SQL queries and the syntax of the knowledge center. In this manner, embodiments of the present disclosure allow for the identification of SQL queries for grouping, thereby preventing delays in executing the search queries.

In another aspect of the disclosure, there is a computer program product including one or more computer readable storage media having program instructions collectively stored on the one or more computer readable storage media. The program instructions are executable to: train a model to identify SQL queries; identify incoming SQL queries; group the incoming SQL queries into groups; monitor resource usage of the incoming SQL queries in the groups; allocate resources to an SQL query of the incoming SQL queries based on the monitoring; receive a request from a user device to allocate a resource; and free the resource in response to the request. In this manner, embodiments of the present disclosure allow for resource allocation, thereby preventing the overloading of resources and also preventing delays in executing search queries.

In embodiments, the computer program product includes ending a task of an incoming SQL query. In this manner, embodiments of the present disclosure allow for resource allocation by ending the task, thereby preventing the overloading of resources.

In another aspect of the disclosure, there is system including a processor, one or more computer readable storage media, and program instructions collectively stored on the one or more computer readable storage media. The program instructions are executable to: train a model to identify SQL queries; identify incoming SQL queries; group the incoming SQL queries into groups; monitor resource usage of the incoming SQL queries in the groups; allocate resources to an SQL query of the incoming SQL queries based on the monitoring; receive a request from a user device to allocate a resource; free the resource in response to the request; and allocate the freed resource according to the request. In this manner, embodiments of the present disclosure allow for resource allocation, thereby preventing the overloading of resources and also preventing delays in executing search queries.

In embodiments, the system includes the incoming SQL queries are grouped based on shared programs. In this manner, embodiments of the present disclosure allow for resource optimization by grouping SQL queries which share programs, thereby preventing the overloading of resources.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION

Figure 1:
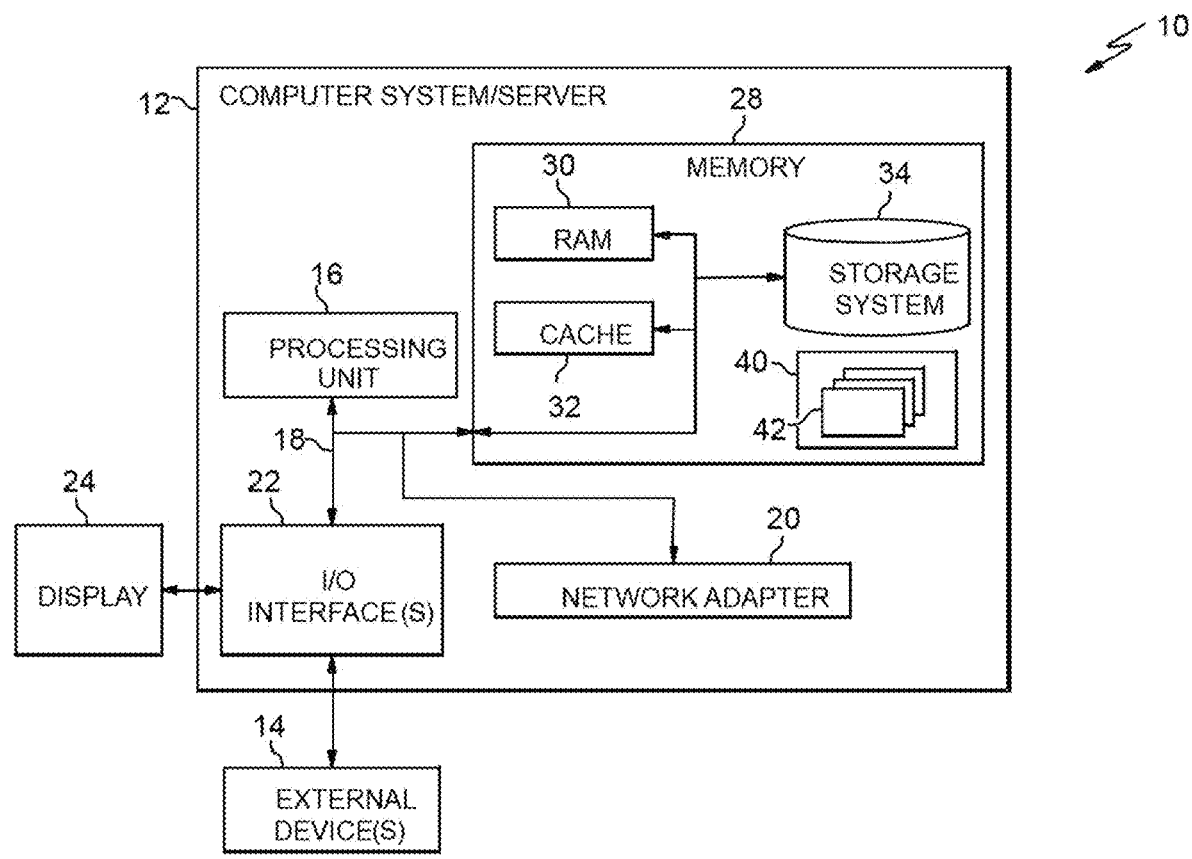
FIG. 1 depicts a cloud computing node according to an embodiment of the present disclosure.

Aspects of the present disclosure relate generally to databases and, more particularly, to a query resource optimizer. According to aspects of the disclosure, systems and processes identify structured query language (SQL) queries and then group these SQL queries in view of any programs the SQL queries share and/or priority. In embodiments, the systems and processes run the groups in parallel, and continuously monitor the groups during the running. As the groups are running, the systems and processes allocate resources accordingly. In this manner, implementations of the disclosure allow for the optimization of computing resources for parallel SQL queries.

In embodiments, the systems and processes dynamically adjust parallelism of SQL queries in view of various factors, including: a SQL query access plan, an execution history of the SQL query, a priority of the SQL query, and a concurrent resource usage by the SQL query, amongst other factors. In embodiments, the systems and processes build up a monitor module and collect workload information from the SQL queries for a parallelism optimizer. In response to receiving the SQL queries, the systems and processes analyze the workload information to identify and group the SQL queries together in view of an SQL query performance sensitivity, an SQL execution history, and an SQL resource usage, amongst other factors. In embodiments, as the SQL queries are run, the systems and processes monitor the SQL queries for SQL resource usage and SQL execution time. In embodiments, in view of the monitoring, the systems and processes regroup the SQL queries with resource contention in a timeline.

In embodiments, the systems and processes include a parallelism optimizer which calculates and schedules the resource usage for the SQL queries in the workloads as the SQL queries are running. In embodiments, the parallelism optimizer estimates a parallelism degree based on priorities of the SQL queries, resource usage of the SQL queries, concurrent resource usage of the SQL queries, and an upcoming workload of SQL queries. In further embodiments, the parallelism optimizer estimates the parallelism degree based on a priority group of an SQL query, a resource contention group, an execution order group, an estimated execution time, and pre-reserving a resource for a task, for determining the parallelism degree. In embodiments, a query agent, i.e., a user, contacts the parallelism optimizer to apply for a resource for a task with a calculated relatively highest parallelism degree. In embodiments, in response to a new workload, the systems and processes use the parallelism optimizer to pre-reserve resources for parallel tasks for executing the SQL queries in the new workload. In embodiments, allocation of resources for tasks are based on a triggering of time, such as an execution of a relatively high priority SQL query within a time window. In embodiments, allocation of resources for tasks are based on a triggering of an execution order, e.g., reserve a resource for a parallel request based on execution order.

In embodiments, the parallelism optimizer dynamically rebalances the resource usage for the concurrent queries in the workloads. In embodiments, a rebalancing of resources occurs when there is a shortage of resources for a new incoming relatively high priority SQL query. Further, a rebalancing of system resources occurs when there is a conditional request for a resource for a task from other running workloads of SQL queries that are relatively lower priority. In this embodiment, the systems and processes force a resource performing a task from other running workloads of SQL queries that have a relatively lower priority. In further embodiments, when a resource is released from another workload, and no relatively high priority SQL query comes up in a following time window, the systems and processes allocate the released resource to a current running SQL query to speed up the remaining workload based on priority.

In embodiments, a task pool manager dynamically adjusts the resource usage by freeing a resource after finishing a task if the request to free the resource is conditional. In embodiments, the task pool manager saves and cancels a current a task and frees the resource in response to the request. In embodiments, the query agent could pick up the saved but not finished work and request another resource for a task to continue processing of an SQL query.

Implementations of the disclosure can improve computer technologies by improving databases. Specifically, aspects of the disclosure can improve databases by optimizing database resources for parallel running SQL queries. To optimize the resources, the systems and processes identify SQL queries in a workload. In embodiments, the identifying includes identifying syntax in the SQL queries and comparing the syntax to a knowledge center. In response to a match, the systems and process identify the SQL queries. In embodiments, the systems and processes continue to optimize the resources of the database by grouping the SQL queries according to programs which the SQL queries utilize. In response to grouping the SQL queries, the systems and processes run the groups in the database. As the groups are running, the systems and processes monitor the SQL queries within the groups to determine if resources need allocation. In embodiments, if resources need allocating, the systems and processes force a resource to stop performing a task, and then allocate that resource to an SQL query to perform another task. In further embodiments, the systems and processes receive a request from a user device to allocate a resource for another SQL query. In response to receiving the request, the systems and processes force a resource to stop performing a task and allocate that resource to the SQL query in the request. In this way, the systems and processes improve database performance by taking full advantage of system resources, without overloading resources. Specifically, identifying SQL queries, grouping the SQL queries together which share similar programs, and monitoring the resource usage of the SQL queries allows for resource allocation, thereby solving the technical problem of overloading the resources of a database.

It is to be understood that the aforementioned advantages, as well as other advantages described herein, are example advantages and should not be construed as limiting. Embodiments of the present disclosure can contain all, some, or none of the advantages while remaining within the spirit and scope of the present disclosure.

In addition, the steps for optimizing query resources are unconventional. In embodiments, aspects of the disclosure: a) train a model to identify SQL queries; b) identify incoming SQL queries; c) group the incoming SQL queries into groups; d) monitor resource usage of the incoming SQL queries in the groups; e) Allocate resources to an SQL of the incoming SQL queries based on the monitoring; f) receive a request from a user device to reallocate a resource; g) free the resource in response to the request; and h) allocate the freed resource according to the request. These unconventional steps allow for the optimizing of query resources.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
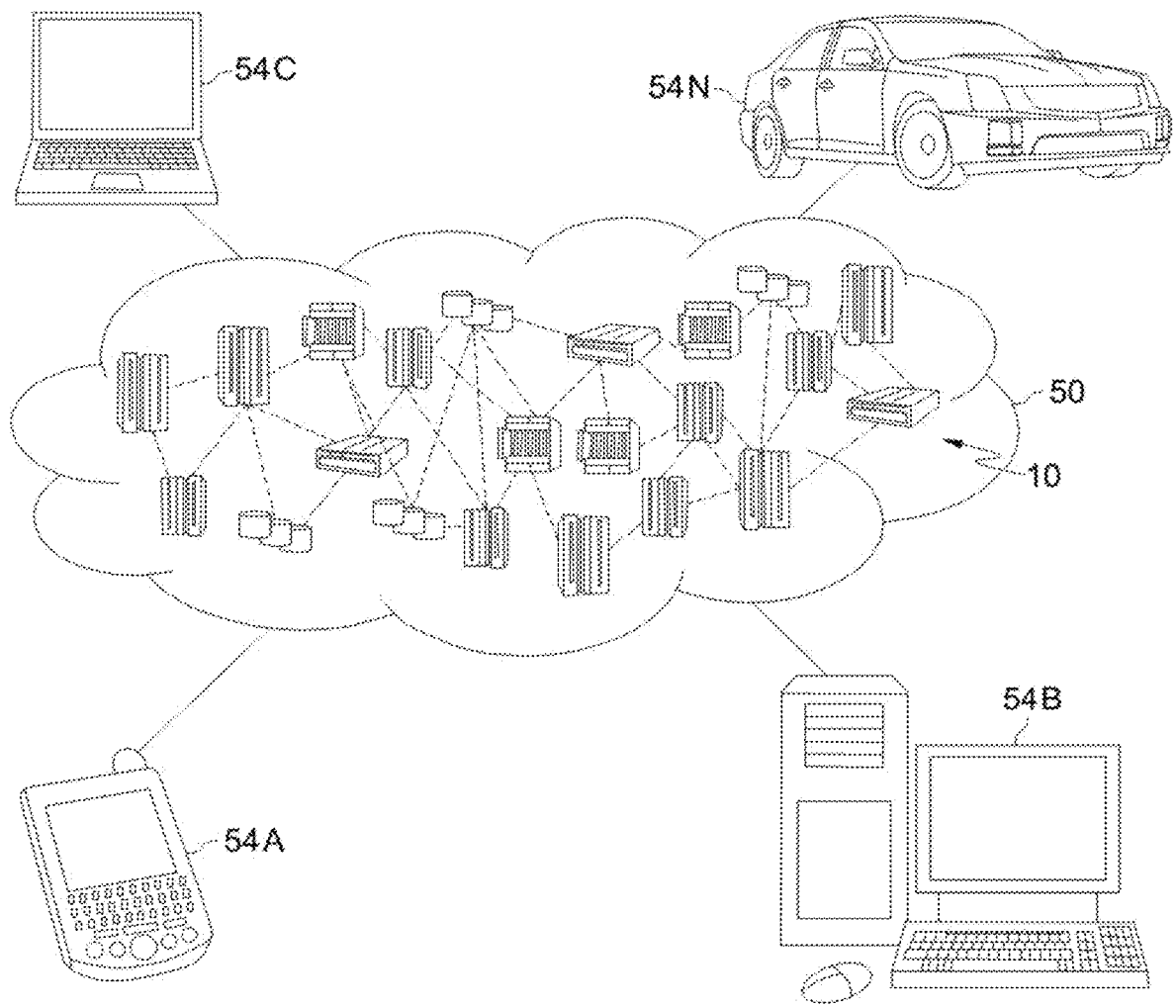
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
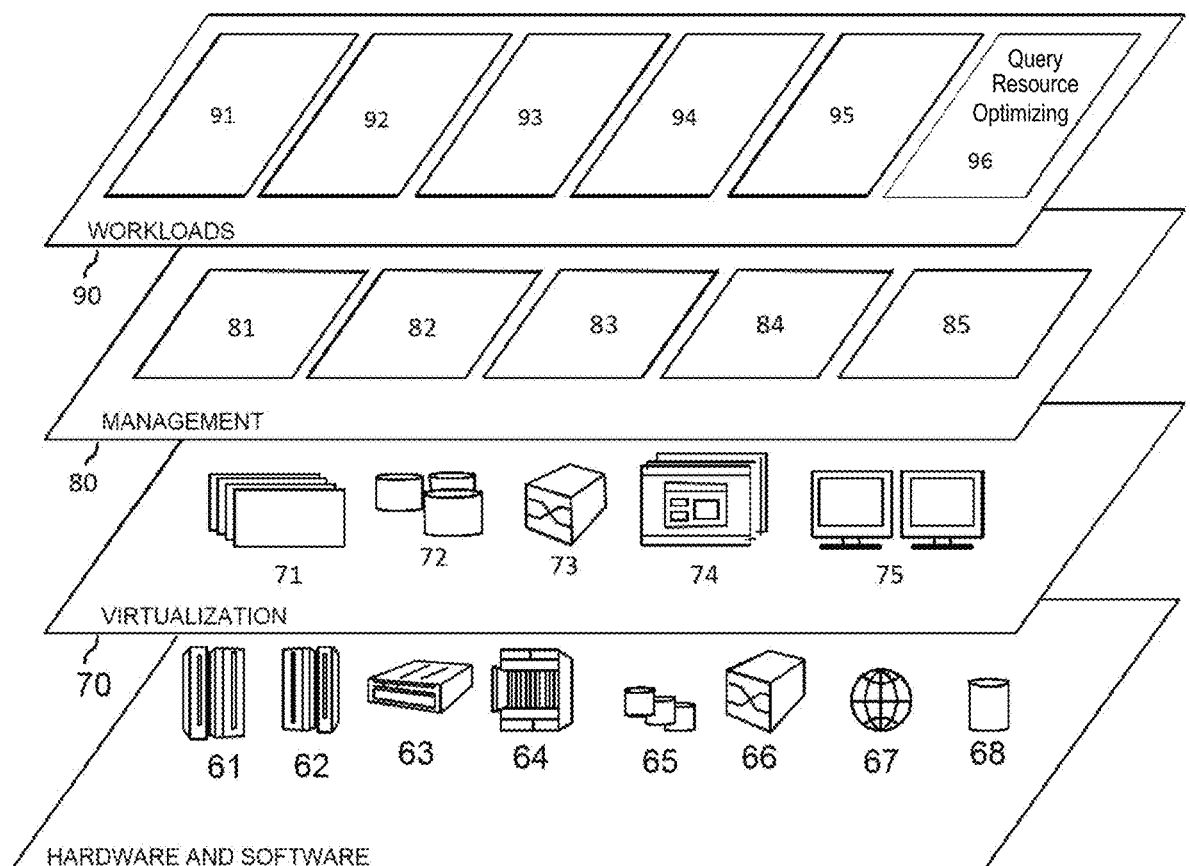
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query resource optimizing 96.

Implementations of the disclosure may include a computer system/server 12 of FIG. 1 in which one or more of the program modules 42 are configured to perform (or cause the computer system/server 12 to perform) one of more functions of the query resource optimizing 96 of FIG. 3. For example, the one or more of the program modules 42 may be configured to: a) train a model to identify SQL queries; b) identify incoming SQL queries; c) group the incoming SQL queries into groups; d) monitor resource usage of the incoming SQL queries in the groups; e) allocate resources to an SQL of the incoming SQL queries based on the monitoring; f) receive a request from a user device to reallocate a resource; g) free the resource in response to the request; and h) allocate the freed resource according to the request.

Figure 4:
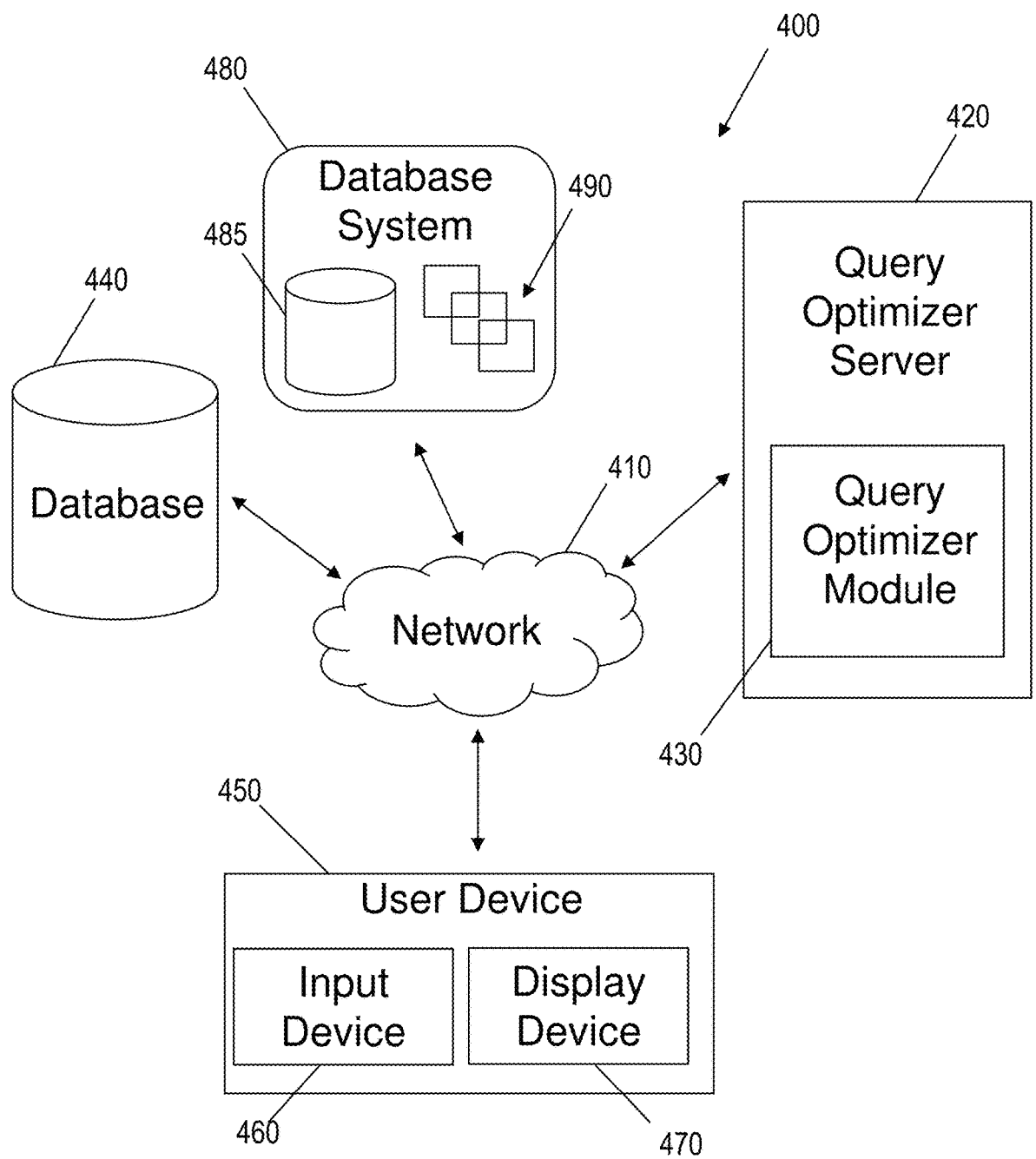
FIG. 4 shows a block diagram of an exemplary environment in accordance with aspects of the disclosure.

FIG. 4 shows a block diagram of an exemplary environment in accordance with aspects of the disclosure. In embodiments, the environment 400 includes a network 410, a query optimizer server 420, a database 440, a user device 450, which requests Structured Query Language (SQL) queries, and a database system 480 having a database 485 and servers 490. The query optimizer server 420 is a computing device comprising one or more components of computer system/server 12 of FIG. 1. In embodiments, the user device 450 may be a smartphone, a laptop computer, a desktop computer, and a tablet computer, for example, and comprises one or more components of computer system/server 12 of FIG. 1.

In embodiments, the user device 450 includes an input device 460 and a display device 470. In embodiments, the input device 460 includes a mouse, a keyboard, and a microphone, amongst other input device examples. In embodiments, the display device 470 is a screen which displays information on the user device 450 to a user of the user device 450. In embodiments, the database 485 is a relational database which stores data in tables as rows and columns, with the servers 490 providing computing resources to retrieve data from the tables within the database 485. In embodiments, a user of the user device 450 enters SQL queries through the input device 460 of the user device 450 to retrieve data from the database 485. An example of a user is a software developer, a software engineer, a software architect, a programmer, or other software professional, amongst other examples. In embodiments, the user views a result set of the data on the display device 470 of the user device 450.

In embodiments, the query optimizer server 420 comprises a query optimizer module 430, which comprises one or more program modules such as program modules 42 described with respect to FIG. 1. The query optimizer server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the network 410 is any suitable network including any combination of one or more of a LAN, WAN, or the Internet. In a particular embodiment, the network 410 is representative of a cloud computing environment 50 as described in FIG. 2.

Relational databases, e.g., database 485, are configurable to run multiple parallel operations when accessing data from a table or index in a partitioned table space. As an example, a user device breaks a relatively large SQL query into multiple relatively smaller SQL queries because the database is capable of handling multiple parallel operations. In this example, these relatively smaller queries run simultaneously on multiple processors accessing data in parallel, which reduces an elapsed time in comparison to running the relatively large query.

In embodiments, a SQL query includes a relational database specific programming language which allows for retrieving data from the tables within the relational database. In embodiments, a SQL query includes statements for performing a sequence of operations for retrieving the data. In further embodiments, statements of a SQL query include syntax for instructing operators to perform specific actions. As an example, syntax of the statements includes letters, digits, and special characters, amongst other examples.

Figure 5:
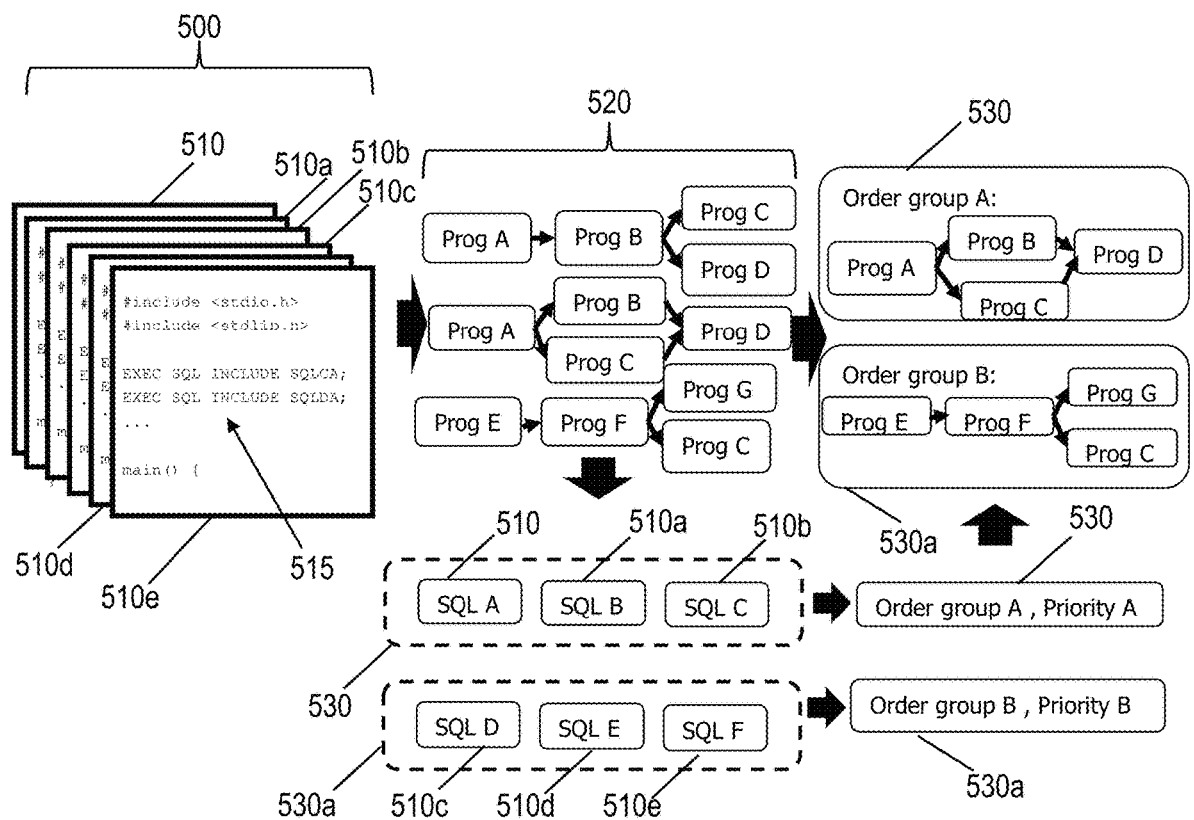
FIG. 5 shows a grouping of structured query language (SQL) queries in accordance with aspects of the disclosure.

FIG. 5 illustrates a grouping of SQL queries 510, 510a, 510b, 510c, 510d, 510e in accordance with aspects of the disclosure. FIG. 5 is described with reference to elements depicted in FIG. 4. In embodiments, the SQL queries 510, 510a, 510b, 510c, 510d, 510e are run in the database 485 to retrieve data within the database 485 using the resources of the servers 490.

Referring to FIG. 5, in embodiments, the query optimizer module 430 begins optimizing the computing resources of the servers 490 by identifying an SQL query and a corresponding program the SQL query uses. In embodiments, to identify an SQL query of a workload, the query optimizer module 430 trains a model using a learning phase to develop a knowledge center for identifying an SQL query and the corresponding programs 520 that the SQL query utilizes. In embodiments, the knowledge center is stored in the database 440.

In embodiments, the programs 520 include access plans for accessing tables within the database 485. In further embodiments, the programs 520 include execution structures, which include operators that detail a logical path for executing the statements of an SQL query of the SQL queries 510, 510a, 510b, 510c, 510d, 510e. In further embodiments, the programs include tasks which are specific instructions to retrieve data objects from the tables within the database 485. As an example, a first task is to retrieve data objects from a row in a first table, while a second task is to retrieve data objects from a different row in the same table. In embodiments, the programs 520 use a computing resource of the servers 490. In embodiments, these computing resources include a processing thread of the servers 490 and a memory of the servers 490, amongst other computing resources. In embodiments, each task uses a resource to perform the functions of the task. In embodiments, the resource is a processing thread of the servers 490.

In embodiments, during the learning phase to train the model to identify SQL queries, the query optimizer module 430 uses machine learning to learn the syntax which corresponds to an SQL query of the SQL queries 510, 510a, 510b, 510c, 510d, 510e. Specifically, as the user device 450 enters an SQL query using the input device 460, the query optimizer module 430 compiles syntax data as training data. In embodiments, as the training data compiles over time, the query optimizer module 430 trains a knowledge center of the model using the training data so that the knowledge center includes syntax and further includes which SQL query belongs to that syntax. To identify an SQL query, the query optimizer module 430 compares syntax of the SQL query to syntax in the knowledge center. In response to finding a match between syntax of an incoming query and syntax within the knowledge center, the query optimizer module 430 identifies the incoming SQL query.

In embodiments, the training data includes programs 520 that correspond to an SQL query. In this way, the knowledge center includes which programs belong to the SQL queries within the knowledge center. Accordingly, the query optimizer module 430 determines which programs belong to incoming SQL queries using the knowledge center in view of identifying the incoming SQL queries. In embodiments, as an SQL query is running in the database 485, training data of which program of the programs 520 the SQL query is utilizing compiles over time. As an example, the training data includes that the SQL query utilizes program A (prog A), which includes a specific access plan, a specific execution structure, and specific tasks. In this way, the query optimizer module 430 trains a knowledge center using the training data so that the knowledge center includes which syntax belongs to which SQL query and which programs of the programs 520 that SQL query utilizes. In embodiments, the knowledge center resides within the database 440 and is accessible by the query optimizer module 430 through the network 410. Accordingly, as the knowledge center grows to include training data for new SQL queries, the query optimizer module 430 is able to identify the SQL query and the corresponding programs that SQL query utilizes.

Continuing with FIG. 5, in response to the training, the query optimizer module 430 identifies SQL queries 510, 510a, 510b, 510c, 510d, 510e of an incoming workload 500. In embodiments, the user of the user device 450 creates the workload by entering the SQL queries 510, 510a, 510b, 510c, 510d, 510e using the input device 460. In further embodiments, a plurality of users enter the SQL queries 510, 510a, 510b, 510c, 510d, 510e using a plurality of user devices.

In embodiments, the query optimizer module 430 identifies the SQL queries 510, 510a, 510b, 510c, 510d, 510e in the workload 500. In embodiments, the query optimizer module 430 identifies the SQL queries 510, 510a, 510b, 510c, 510d, 510e by comparing the syntax 515 in an SQL query to syntax within the knowledge center which corresponds to a previous SQL query. In response to determining a match between the syntax in the workload 500 and the syntax in the knowledge center, the query optimizer module 430 identifies an SQL query of the SQL queries 510, 510a, 510b, 510c, 510d, 510e. In embodiments, in response to identifying each SQL query of the SQL queries 510, 510a, 510b, 510c, 510d, 510e, the query optimizer module 430 identifies the corresponding programs of the programs 520 for that SQL query.

In embodiments, in response to identifying each SQL query of the SQL queries 510, 510a, 510b, 510c, 510d, 510e and their corresponding programs 520, the query optimizer module 430 group SQL queries together which share a program. As an example, SQL query 510, SQL query 510a, and SQL query 510b share the programs Prog A, Prog B, Prog C, Prog D together. Accordingly, the query optimizer module 430 groups SQL query 510, SQL query 510a, and SQL query 510b together in group 530 based on the program they share. As another example, SQL query 510c, SQL query 510d, SQL query 510e share the programs Prog C, Prog E, Prog F, Prog G together. Accordingly, the query optimizer module 430 groups SQL query 510c, SQL query 510d, SQL query 510e together in group 530a.

In embodiments, the query optimizer module 430 uses priorities of the SQL queries 510, 510a, 510b, 510c, 510d, 510e to determine which group of the groups 530, 530a runs first. In embodiments, priorities are inputs from a user of the user device 450. As an example, a user inputs that the SQL query 510 has a higher priority than SQL query 510c.

In further embodiments, in addition to inputs from the user, the query optimizer module 430 determines priorities using the knowledge center. As an example, the query optimizer module 430 uses execution histories of the SQL queries 510, 510a, 510b, 510c, 510d, 510e within the knowledge center to determine priorities. As a more specific example, the execution histories of SQL query 510b and SQL query 510d indicate that the SQL query 510b has been run more times than SQL query 510d. In this example, the query optimizer module 430 determines that the SQL query 510b has a higher priority than SQL query 510d. Accordingly, group 530, which includes SQL query 510b, is run before group 530a because group 530 has a higher priority than group 530a. As another example, in addition to or instead of using the execution history, the query optimizer module 430 determines priority using computing resource usage within the knowledge center. As an example, the computing resource usage data from the knowledge center indicates that SQL query 510a uses more computing resources than SQL query 510e. In this example, the query optimizer module 430 determines that SQL query 510a has a higher priority than SQL query 510e.

Figure 6A:
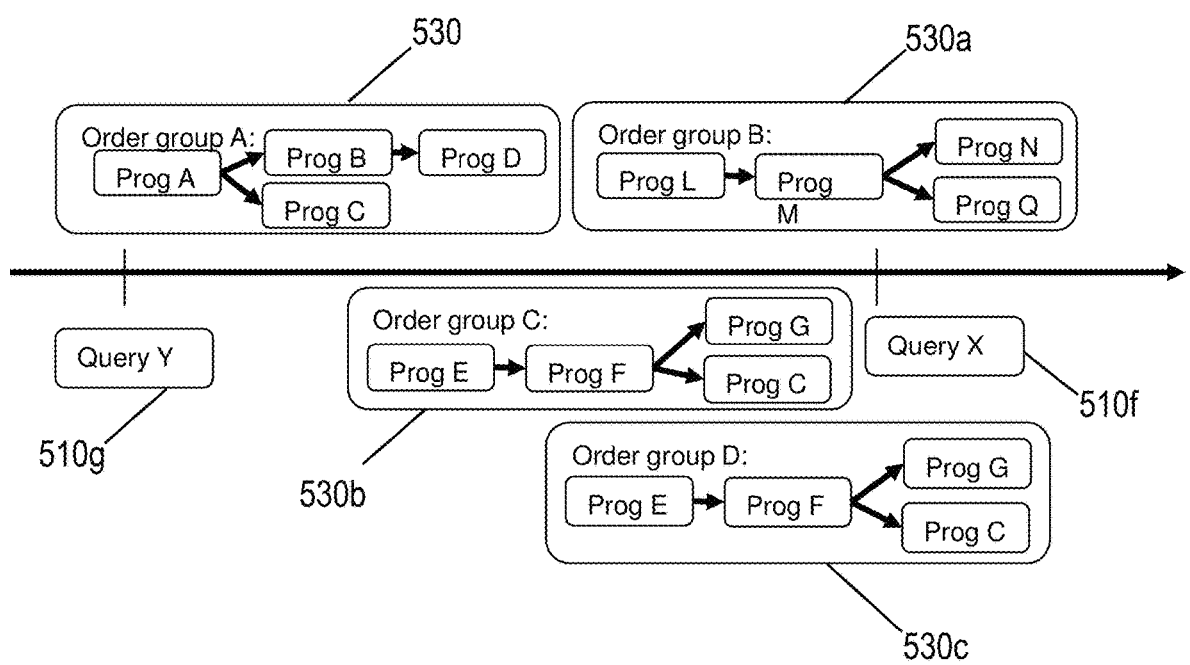
FIGS. 6A-6C show allocation of computing resources in accordance with aspects of the disclosure.
Figure 6B:
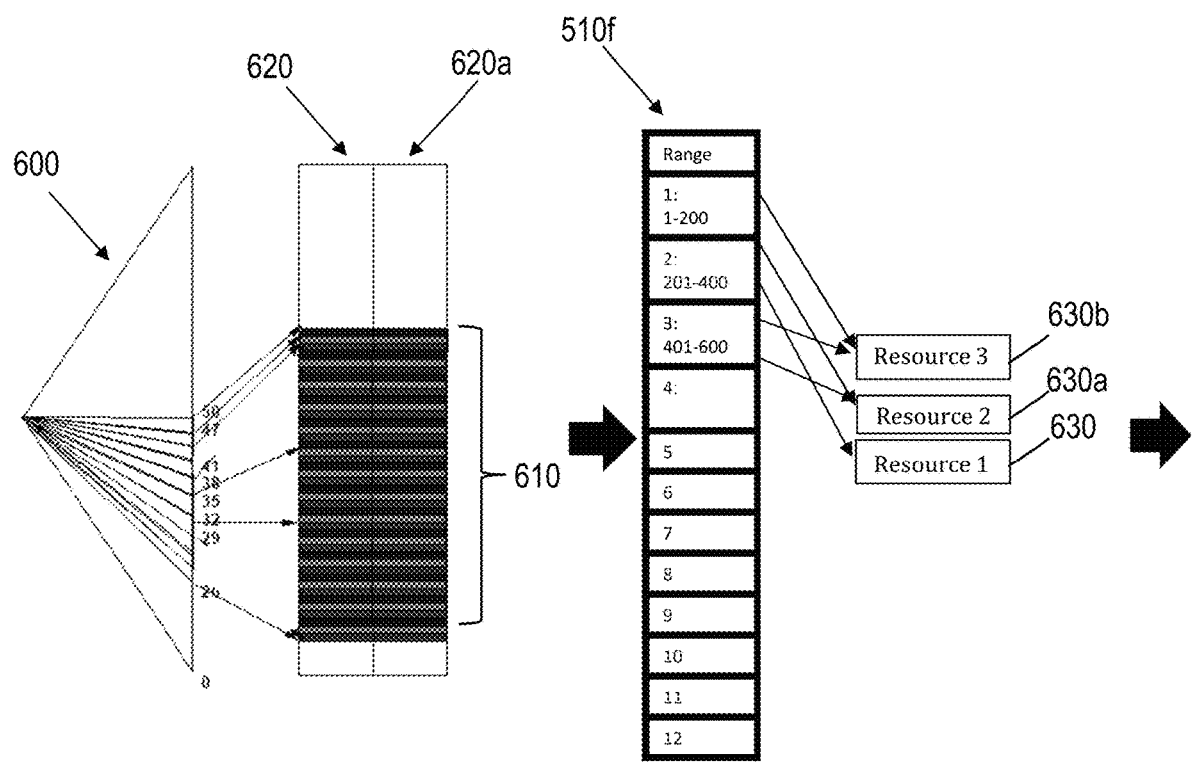

FIGS. 6A and 6B illustrate an allocation of computing resources in accordance with aspects of the disclosure. FIGS. 6A and 6B are described with reference to elements depicted in FIGS. 4 and 5. In embodiments, to allocate the resources, the query optimizer module 430 calculates a parallelism degree using logic segments to calculate between SQL queries 510, 510a, 510b, 510c, 510d, 510e within the groups 530, 530b, 530c, and any new SQL query sent by the user device 450.

Referring to FIG. 6A, as the groups 530, 530b, 530c are running, a user device 450 (query agent) sends new SQL queries 510a, 510g to the database 485. In embodiments, in response to the new queries 510f, 510g, the query optimizer module 430 identifies the new SQL queries 510f, 510g, by comparing the syntax of the new SQL queries 510f, 510g to the syntax in the knowledge center. In response to determining a match between the syntax of the new SQL queries 510f, 510g and the syntax within the knowledge center, the query optimizer module 430 identifies the new SQL queries 510f, 510g and the corresponding programs of the programs 520 that the new SQL queries 510f, 510g utilize. In view of this identification, the query optimizer module 430 determines which group of the groups 530, 530a, 530b each new SQL query of the SQL queries 510f, 510g belongs to. In this way, the query optimizer module 430 regroups the groups 530. 530a, 530b in response to new SQL queries.

Referring to FIG. 6B, the query optimizer module 430 calculates a parallelism degree to further optimize the computing resources of the servers 490 in response to identifying a new workload, e.g., SQL queries 510f, 510g. Specifically, a table 600 of the database 485 includes rows 610 and columns 620, 620a of data objects. In embodiments, to calculate the parallelism degree, the query optimizer module 430 divides these data objects into logical segments. As an example, a first logical segment includes objects 1-200. As another example, a second logical segment includes objects 201-400. As another example, a third logical segment includes objects 401-600. As shown in FIG. 6B, the SQL query 510f includes the resources 630, 630a, 630b, which are processing threads to carry out specific instructions as tasks. As shown in FIG. 6B, the resources 630, 630a, 630b are performing the tasks of retrieving data objects from the table 600 within the database 485. In embodiments, the parallelism degree is a numerical value representing the number of logical segments, e.g., 20, amongst other examples.

In embodiments, the query optimizer module 430 calculates a parallelism degree based on these logical segments. As an example, SQL query 510 of group 530 of FIG. 5 requests the data objects 1001-2000. In this example, a new workload, e.g., SQL query 510f, is also requesting the data objects 201-400. In this example, the query optimizer module 430 calculates a relatively high parallelism degree for the SQL queries 510, 510f because both of the SQL queries 510, 510g are requesting the same logical segments. Accordingly, since the SQL query 510 has a relatively high priority, the query optimizer module 430 will allocate resources to the SQL query 510f to run parallel with the SQL query 510.

In embodiments, in addition to or instead of the logical segments, the query optimizer module 430 calculates the parallelism degree using database access plans, an SQL join method of joining the workload 500, and an SQL join sequence, amongst other examples. In even further embodiments, the parallelism degree is based on a SQL query's priority group, a SQL query's resource contention group, an execution order group of SQL queries, an estimated execution time of an SQL query, and a pre-reserve subtask resource, amongst other examples. In this way, in addition to or instead of the logical segments, the parallelism degree is based on priorities, resource usage, and concurrent resource usage, as well as an upcoming workload of SQL queries.

In embodiments, in order to allocate resources of the servers 490 for the new workload, i.e., SQL queries 510f, 510g, the query optimizer module 430 monitors the SQL queries 510, 510a, 510b, 510c, 510d, 510e as they run in the database 485. In embodiments, the query optimizer module 430 polls the servers 490 to determine the amount of resources available from the servers 490, with each resource representing a task it performs. As an example, the query optimizer module 430 polls the servers 490 and determines that 25 resources are available for use. In response to determining the amount of computing resources available, the query optimizer module 430 determines how many computing resources to allocate to an SQL query in view of the priority of the SQL query, the resource usage of the SQL query, and/or an access plan of the SQL query, amongst other factors. As an example, the query optimizer module 430 allocates 8 resources for use by SQL query 510f out of the available 25 resources. In this example, the query optimizer module 430 allocates more resources to SQL query 510f than another SQL query because SQL query 510f has a relatively higher priority. However, if a relatively higher SQL query is running parallel with the SQL query 510f, e.g., SQL query 510, the query optimizer module 430 may not allocate all of the 8 resources. Instead, the query optimizer module 430 only allocates 7 resources for the SQL query 510f, instead of the 8 in the request from the user device 450.

Figure 6C:
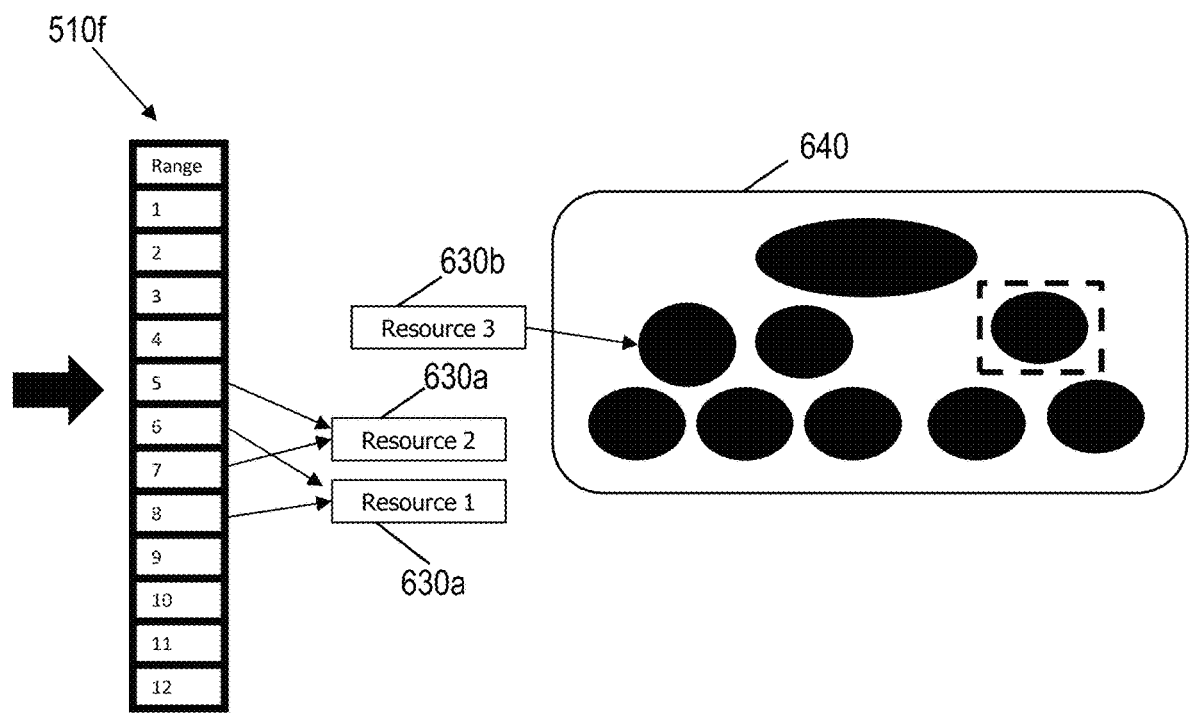

Referring to FIG. 6C, the query optimizer module 430 continues to monitor the SQL queries 510, 510a, 510b, 510c, 510d, 510e as they run by polling the servers 490. In embodiments, the query optimizer module 430 adjusts resource usage in response to monitoring. As an example, if a user device 450 requests an SQL query with a higher priority than the SQL query 510f which is currently running, the query optimizer module 430 frees a resource, e.g., 630b, after the resource finishes a task, e.g., retrieving data objects 1-200 and 401-600. As shown in FIG. 6C, the query optimizer module 430 frees the resource 630b from the SQL query 510f and sends the resource 630b into the pool of resources 640. As shown in FIG. 6C, in this example, the query optimizer module 430 frees a single resource, e.g., resource 630b. In embodiments, the query optimizer module 430 frees any number of resources. As an example, in addition to freeing the resource 630b, the query optimizer module 430 also frees resource 630a if need be. In this way, the query optimizer module 430 dynamically balances resource usage for the concurrently running SQL queries, e.g., 510, 510a, 510b, 510c, 510d, 510e, 510f, 510g.

In embodiments, the query optimizer module 430 frees a resource which is working on a task from an SQL query by sending an instruction to the servers 490. In further embodiments, the query optimizer module 430 saves the SQL query and then cancels the work of the task, thereby freeing the resource working on that task. In embodiments, the query optimizer module 430 frees a resource for a higher priority SQL query by freeing a resource from a lower priority SQL query.

In embodiments, as the SQL queries 510, 510a, 510b, 510c, 510d, 510e are running, the query optimizer module 430 receives a request from a user device 450 (query agent) to allocate a resource for an SQL query. In embodiments, the request includes which SQL query needs a resource. As an example, SQL query 510 has a task needing completion. In this example, the query optimizer module 430 frees a resource from a lower priority SQL query, e.g., 510e, to perform the task for the SQL query 510. In embodiments, the query optimizer module 430 allocates the resource to the SQL query in the request. In embodiments, the query optimizer module 430 receives the request from the user device 450 through the network 410.

Figure 7:
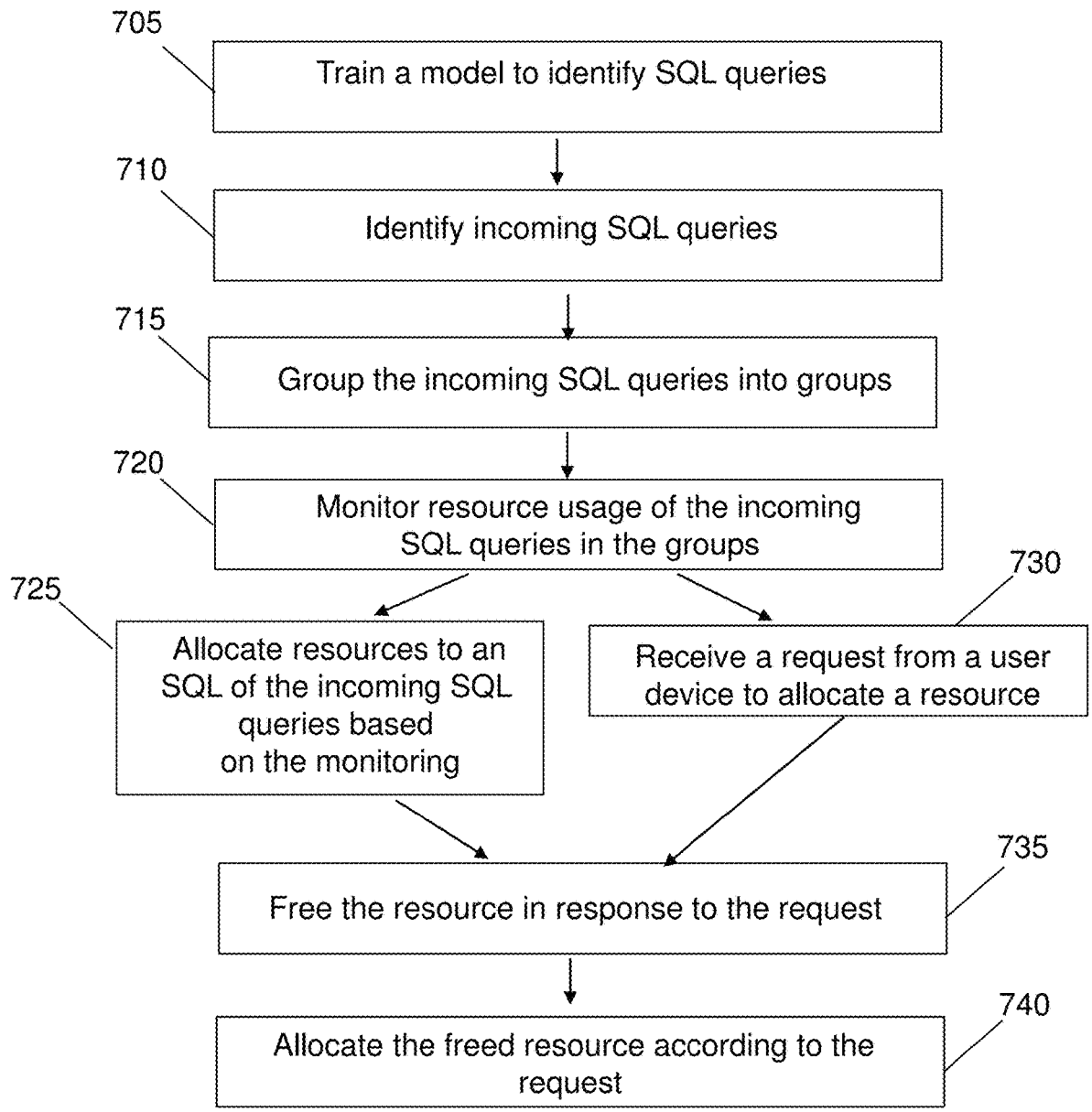
FIG. 7 shows a flowchart of an exemplary method in accordance with aspects of the disclosure.

FIG. 7 shows a flowchart of an exemplary method in accordance with aspects of the present disclosure. Operations of the method may be carried out in the environment of FIG. 4 and are described with reference to elements depicted in FIGS. 4-6B.

At operation 705, the system trains a model to identify SQL queries. In embodiments, and as described with respect to FIGS. 4-6B, the query optimizer module 430 trains a model using a learning phase to develop a knowledge center for identifying an SQL query and the corresponding programs 520 which that SQL query utilizes. In embodiments, the query optimizer module 430 trains the model by using machine learning to learn the syntax which corresponds to an SQL query. In embodiments, the query optimizer module 430 stores the knowledge center in the database 440.

At operation 710, the system identifies new SQL queries using the model. In embodiments, and as described with respect to FIGS. 4-6B, the query optimizer module 430 compares syntax of the SQL queries 510, 510a, 510b, 510c, 510d, 510e to syntax in the knowledge center. In embodiments, the query optimizer module 430 identifies the SQL queries 510, 510a, 510b, 510c, 510d, 510e in response to finding a match between syntax of the new SQL queries 510, 510a, 510b, 510c, 510d, 510e and syntax within the knowledge center.

At operation 715, the system groups the new SQL queries into groups. In embodiments, and as described with respect to FIGS. 4-6B, the query optimizer module 430 groups the SQL queries 510, 510a, 510b, 510c, 510d, 510e into the groups 530, 530a in view of programs 520 that the SQL queries 510, 510a, 510b, 510c, 510d, 510e share with one another.

At operation 720, the system monitors resource usage of the new SQL queries in the groups. In embodiments, and as described with respect to FIGS. 4-6B, the query optimizer module 430 monitors resource usage of the new SQL queries 510, 510a, 510b, 510c, 510d, 510e in the groups 530, 530a by polling the servers 490.

At operation 725, the system allocates resources based on the monitoring. In embodiments, and as described with respect to FIGS. 4-6B, the query optimizer module 430 polls the servers 490 to determine the amount of resources available from the servers 490, with each resource representing a task it performs. In response to determining the amount of resources available, the query optimizer module 430 determines how many resources to allocate to an SQL query in view of the priority of the SQL query, the resource usage of the SQL query, and/or an access plan of the SQL query, amongst other factors.

At operation 730, the system receives a request from a user device to allocate a resource. In embodiments, and as described with respect to FIGS. 4-6B, the query optimizer module 430 receives the request from the user device 450 through the network 410.

At operation 735, the system frees the resource in response to the request. In embodiments, and as described with respect to FIGS. 4-6B, the query optimizer module 430 frees the resource by sending an instruction to the servers 490.

At operation 740, the system allocates the freed resource according to the request. In embodiments, and as described with respect to FIGS. 4-6B, the query optimizer module 430 allocates the resource to the SQL query in the request.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the disclosure provides a computer-implemented method, via a network. In this case, a computer infrastructure, such as computer system/server 12 (FIG. 1), can be provided and one or more systems for performing the processes of the disclosure can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising: training, by a computing device, a model to identify SQL queries;
identifying, by the computing device, incoming SQL queries using the model;
grouping, by the computing device, the incoming SQL queries into groups;
monitoring, by the computing device, resource usage of the incoming SQL queries in the groups by polling at least one server to determine a resource amount available for the at least one server, and each resource of the at least one server represents a task being performed;
receiving, by the computing device, a new SQL query with a new workload;
allocating, by the computing devices, a first set of resources which have a highest determined parallelism degree for executing the new SQL query with the new workload;
allocating, by the computing device, a second set of resources to an SQL query of the incoming SQL queries based on a priority of the SQL query, an access plan of the SQL query, and a resource usage of the SQL query in response to a determination of the resource amount available for the at least one server;
determining the priorities of the incoming SQL queries based on execution histories of the incoming SQL queries, wherein the priorities of the incoming SQL queries are determined by how many times the incoming SQL queries have been run such that one of the incoming SQL queries that has been run a highest amount of times has a highest priority and another one of the incoming SQL queries that has been run a lowest amount of times has a lowest priority,
and determining, by the computing device, a parallelism degree based on priorities of the incoming SQL queries, resource usages of the incoming SQL queries, and an upcoming workload of the incoming SQL queries,
wherein the model comprises a machine learning model which is trained to learn SQL syntax according to the access plan of the SQL query, an execution structure which includes at least one operator which details a logical path for executing statements of the SQL queries, and at least one task which includes at least one instruction to retrieve a data object from at least one table within a database, and the access plan of the SQL query, the execution structure, wherein the training the model includes building a knowledge center of syntax, and the at least one task correspond with a plurality of programs associated with previous SQL queries.

2. The method of claim 1, wherein the identifying the incoming SQL queries includes comparing syntax of the incoming SQL queries to the syntax within the knowledge center, and the priority of the SQL query is based on an execution history of the SQL query.

3. The method of claim 1, wherein the identifying the incoming SQL queries includes finding a match between syntax of the incoming SQL queries and the syntax of the knowledge center.

4. The method of claim 1, wherein the knowledge center includes the programs belonging to the incoming SQL queries, and the programs comprise the access plan of the SQL query, the access plan of the SQL query comprises information for accessing tables within the database, the execution structure which includes the at least one operator which details the logical path for executing statements of the SQL queries, and the at least one task which includes the at least one instruction to retrieve the data object from the at least one table within the database.

5. The method of claim 4, wherein the grouping the incoming SQL queries is based on the programs the incoming SQL queries share.

6. The method of claim 1, further comprising calculating the parallelism degree between the new SQL query and the incoming SQL queries.

7. The method of claim 6, wherein the parallelism degree between the new SQL query and the incoming SQL queries is based on tasks shared between the new SQL query and the incoming SQL queries.

8. The method of claim 1, wherein the allocating the resources to the SQL query includes freeing a resource from an incoming SQL query of the incoming SQL queries.

9. The method of claim 1, wherein the computing device includes software provided as a service in a cloud environment.

10. The method of claim 1, wherein the allocating of the first set of resources which have the highest determined parallelism degree is based on an execution time of a high priority SQL query within a time window, and the execution time of the high priority SQL query is based on an execution history of the high priority SQL query.

11. A computer program product comprising one or more computer readable storage media having program instructions collectively stored on the one or more computer readable storage media, the program instructions executable to: train a model to identify SQL queries;
- identify incoming SQL queries;
- group the incoming SQL queries into groups;
- monitor resource usage of the incoming SQL queries in the groups by polling at least one server to determine a resource amount available for the at least one server, and each resource of the at least one server represents a task being performed;
- receive a new SQL query with a new workload;
- determine a parallelism degree based on priorities of the incoming SQL queries, resource usages of the incoming SQL queries, and an upcoming workload of the incoming SQL queries;
- allocate a first set of resources which have a highest determined parallelism degree for executing the new SQL query with the new workload;
- determining the priorities of the incoming SQL queries based on execution histories of the incoming SQL queries, wherein the priorities of the incoming SQL queries are determined by how many times the incoming SQL queries have been run such that one of the incoming SQL queries that has been run a highest amount of times has a highest priority and another one of the incoming SQL queries that has been run a lowest amount of times has a lowest priority,
- allocate a second set of resources to an SQL query of the incoming SQL queries based on the priority of the SQL query, an access plan of the SQL query, and a resource usage of the SQL query in response to a determination of the resource amount available for the at least one server;
- receive a request from a user device to allocate a resource;
- free the resource in response to the request, wherein the freeing the resource includes ending a task of an incoming SQL query, and the freed resource is sent to a pool of resources,
- wherein the model comprises a machine learning model which is trained to learn SQL syntax according to the access plan of the SQL query, an execution structure which includes at least one operator that details a logical path for executing statements of the SQL queries, and at least one task which includes at least one instruction to retrieve a data object from at least one table within a database, and the access plan of the SQL query, the execution structure, and the at least one task correspond with a plurality of programs associated with previous SQL queries.

12. The computer program product of claim 11, wherein the SQL queries include tasks, and the priority of the SQL query is based on an execution history of the SQL query.

13. The computer program product of claim 12, wherein the at least one task includes retrieving data from tables within the database.

14. A system comprising: a processor, one or more computer readable storage media, and program instructions collectively stored on the one or more computer readable storage media, the program instructions executable to: train a model to identify SQL queries;
- identify incoming SQL queries;
- group the incoming SQL queries into groups;
- monitor resource usage of the incoming SQL queries in the groups by polling at least one server to determine a resource amount available for the at least one server, and each resource of the at least one server represents a task being performed;
- determining the priorities of the incoming SQL queries based on execution histories of the incoming SQL queries, wherein the priorities of the incoming SQL queries are determined by how many times the incoming SQL queries have been run such that one of the incoming SQL queries that has been run a highest amount of times has a highest priority and another one of the incoming SQL queries that has been run a lowest amount of times has a lowest priority,
- determine a parallelism degree based on the priorities of the incoming SQL queries, resource usages of the incoming SQL queries, and an upcoming workload of the incoming SQL queries;
- receive a new SQL query with a new workload;
- allocate a first set of resources which have a highest determined parallelism degree for executing the new SQL query with the new workload;
- allocate a second set of resources to an SQL query of the incoming SQL queries based on a priority of the SQL query, an access plan of the SQL query, and a resource usage of the SQL query in response to a determination of the resource amount available for the at least one server;
- receive a request from a user device to allocate a resource;
- free the resource in response to the request, wherein the freeing the resource includes ending a task of an incoming SQL query, and the freed resource is sent to a pool of resources;
- and allocate the freed resource according to the request;
- wherein the model comprises a machine learning model which is trained to learn SQL syntax according to the access plan of the SQL query, an execution structure which includes at least one operator which details a logical path for executing statements of the SQL queries, and at least one task which includes at least one instruction to retrieve a data object from at least one table within a database, and the access plan of the SQL query, the execution structure, and the at least one task correspond with a plurality of programs associated with previous SQL queries.

15. The system of claim 14, further comprising, wherein the training the model includes building a knowledge center with syntax.

16. The system of claim 15, wherein the identifying the incoming SQL queries includes comparing syntax of the incoming SQL queries to the syntax within the knowledge center, and the priority of the SQL query is based on an execution history of the SQL query.

17. The system of claim 14, wherein the incoming SQL queries are grouped based on shared programs, and priorities of the incoming SQL queries are used to determine which group runs first.

* * * * *